United States Patent
Lou et al.

(10) Patent No.: US 8,238,487 B2
(45) Date of Patent: Aug. 7, 2012

(54) LOG-LIKELIHOOD RATIO ALGORITHM FOR USE IN REDUCING CO-CHANNEL INTERFERENCE IN WIRELESS COMMUNICATION SYSTEMS

(75) Inventors: Hanqing Lou, Garland, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 810 days.

(21) Appl. No.: 12/321,913

(22) Filed: Jan. 26, 2009

(65) Prior Publication Data
US 2010/0189199 A1 Jul. 29, 2010

(51) Int. Cl.
*H03D 1/00* (2006.01)
*H04L 27/06* (2006.01)

(52) U.S. Cl. ........ 375/341; 375/262; 375/340; 375/346; 714/796

(58) Field of Classification Search .................. 375/262, 375/340, 341, 346; 714/794
See application file for complete search history.

(56) References Cited

U.S. PATENT DOCUMENTS

| | | | |
|---|---|---|---|
| 2004/0033791 A1* | 2/2004 | Schmidl et al. | 455/137 |
| 2005/0157822 A1* | 7/2005 | Khandekar et al. | 375/340 |
| 2007/0110191 A1* | 5/2007 | Kim et al. | 375/340 |
| 2008/0092025 A1 | 4/2008 | Hedayat et al. | |
| 2008/0212694 A1* | 9/2008 | Leach et al. | 375/260 |
| 2008/0267058 A1 | 10/2008 | Kolding et al. | |
| 2008/0273630 A1 | 11/2008 | Mege et al. | |
| 2009/0086855 A1 | 4/2009 | Jin et al. | |

FOREIGN PATENT DOCUMENTS

| | | |
|---|---|---|
| EP | 1 463 229 A1 | 9/2004 |
| EP | 1 988 656 A2 | 11/2008 |
| WO | WO 02/093859 A1 | 11/2002 |

* cited by examiner

*Primary Examiner* — Curtis Odom
(74) *Attorney, Agent, or Firm* — Cindy Kaplan (57) ABSTRACT

In one embodiment, an apparatus includes a receiver configured to receive a transmission from a wireless communication device, the transmission associated with resource units, a detector configured to generate log-likelihood ratio data from the received transmission, and a controller configured to calculate noise and interference for each of the resource units and modify the generated log-likelihood ratio data based on the calculated noise and interference.

11 Claims, 7 Drawing Sheets

LOG-LIKELIHOOD RATIO ALGORITHM FOR USE IN REDUCING CO-CHANNEL INTERFERENCE IN WIRELESS COMMUNICATION SYSTEMS

BACKGROUND OF THE INVENTION

The present disclosure relates generally to wireless communication technology, and more particularly, an algorithm for use in reducing co-channel interference in wireless communication systems.

Co-channel interference (CCI) is a problem in current wireless communication systems. Co-channel interference occurs when two transmitters utilize the same time-frequency resource to transmit data to a receiver. Good frequency planning and multiple antenna techniques may help to reduce the effect of co-channel interference, however, CCI is not avoidable due to the crowded radio spectrum. In the case of severe co-channel interference, the receiver may not be able to distinguish the target signal from the interference signal. As a result, the receiver may fail to decode an entire packet.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises receiving a transmission at a wireless communication device, the transmission associated with resource units, generating log-likelihood ratio data from the received transmission, calculating noise and interference for each of the resource units, and modifying the generated log-likelihood ratio data based on the calculated noise and interference.

In another embodiment, an apparatus generally comprises a receiver configured to receive a transmission from a wireless communication device, the transmission associated with resource units, a detector configured to generate log-likelihood ratio data from the received transmission, and a controller configured to calculate noise and interference for each of the resource units and modify the generated log-likelihood ratio data based on the calculated noise and interference.

In yet another embodiment, an apparatus generally comprises a receiver configured to receive transmission from a wireless communication device, a detector configured to generate log-likelihood ratio data from the received transmission, a controller configured to calculate noise and interference and modify the generated log-likelihood ratio data based on the calculated noise and interference, and a decoder configured to decode data using the modified log-likelihood ratio data. The controller is configured to recalculate the noise and interference if error is present in the decoded data.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
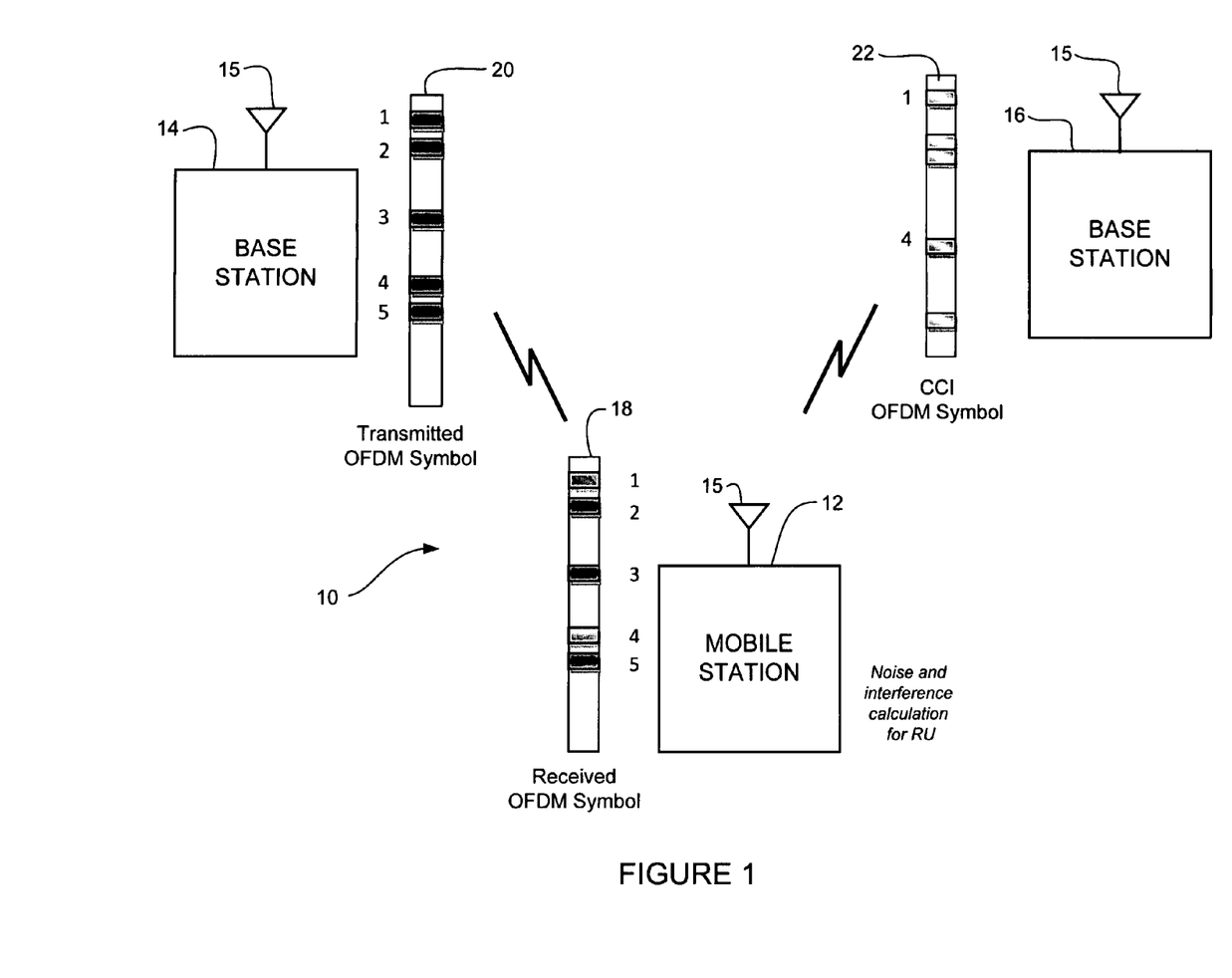
FIG. 1 illustrates an example of a wireless communication network in which embodiments described herein may be implemented.

Embodiments are described herein for reducing co-channel interference in wireless communication systems. FIG. 1 illustrates an example of a wireless communication network 10 in which embodiments described herein may be implemented. The network 10 shown in FIG. 1 includes a mobile station 12 in communication with two base stations 14, 16. Base station 14 is the desired base station to which mobile station 12 is talking, and station 16 is the interference. The mobile station 12 may be any user device in communication with a wireless network. The base stations 14, 16 may connect to other wired data network facilities (not shown) and serve as a gateway or access point through which the mobile station has access to those data network facilities. The mobile station 12 and base stations 14, 16 each include one or more antenna 15 for wireless communication. Each mobile station 12 and base station 14, 16 operates to transmit data to and receive data from other devices in the wireless network. Details of the wireless devices in accordance with one embodiment are described below with respect to FIG. 2.

It is to be understood that the simplified network shown in FIG. 1 is only an example and the embodiments described herein may be implemented in different networks having various network devices and arrangements. In the example shown in FIG. 1, the base stations are transmitting data to the mobile station, however, the mobile station can also transmit data to the base stations. Also, two or more mobile stations may be transmitting and one base station receiving. Thus, the mobile station and base stations can operate as both transmitters and receivers.

The embodiments are described herein in the context of use of OFDMA (Orthogonal Frequency Division Multiple Access) for communication, although the present invention is not limited to OFDMA. OFDMA is widely used in communication systems, such as IEEE 802.11(WiFi), IEEE 802.16 (WiMax), and 3GPP LTE, for example.

In OFDM, the available bandwidth is effectively divided into a plurality of subchannels that are orthogonal in the frequency domain. During a given symbol period, the transmitter transmits a symbol in each subchannel. A high data rate signal is effectively transmitted as a set of parallel low data rate signals, each one being carried over a separate subchannel. In OFDMA systems, multiple users share the frequency-time resources.

Figure 3:
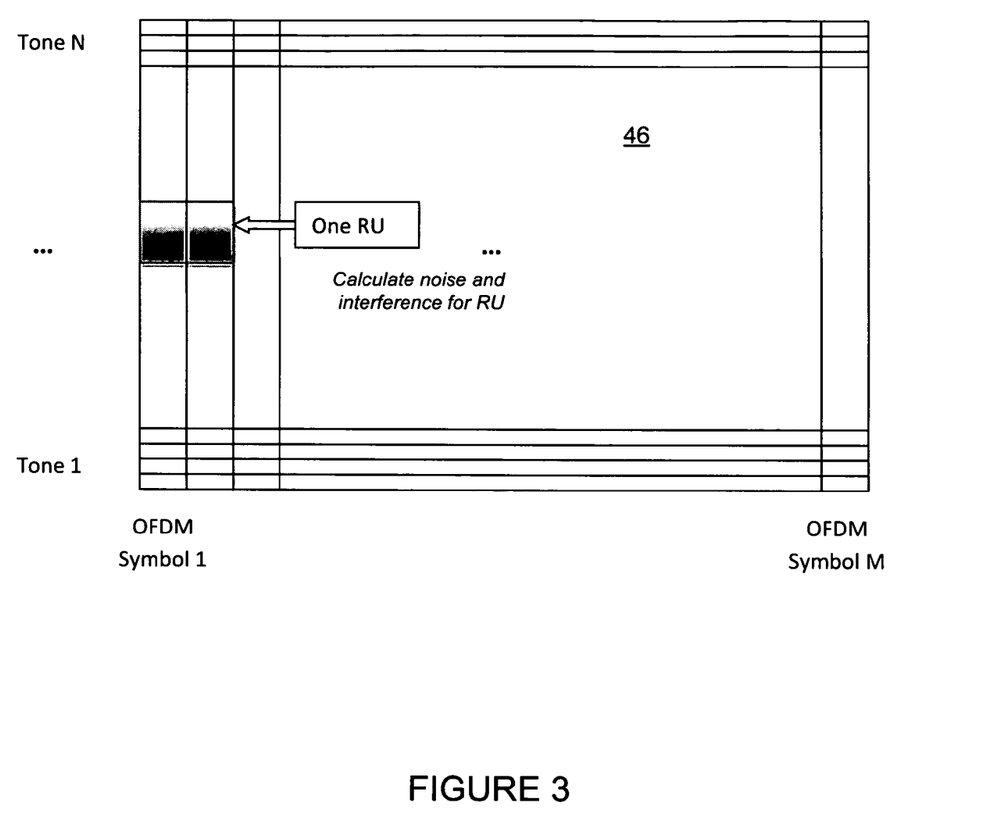
FIG. 3 illustrates an example of an OFDM frame.

FIG. 3 illustrates an OFDM frame 46, which includes M OFDM symbols in a time domain, and N subcarriers or tones in a frequency domain. In OFDM systems, the minimum transmitting unit which can be allocated to one user is typically composed of several adjacent OFDM symbols and several adjacent or non-adjacent tones. This is referred to herein as minimum transmitting unit Resource Unit (RU). Each user may have one or more RUs. Co-channel interference may occur on some RUs but not necessarily all the RUs allocated to one user.

Referring again to FIG. 1, an example of co-channel interference is shown at mobile station 12. Base station 14 is the desired base station for mobile station 12, and base station 16 works as an interference base station in this example. Base station 14 transmits OFDM symbol 20 to mobile station 12. As shown at 20, base station 14 transmits data to mobile station 12 on RU1, RU2, RU3, RU4, and RU5. Base station 16 transmits OFDM symbol 22 to another mobile station (not shown) at the same time. Base station 16 also utilizes RU1 and RU4 to transmit data. Mobile station 12 hears the signal transmitted from base station 16 and cannot distinguish whether the received signal is coming from its associated base station 14, interference from base station 16, or a combination thereof. This results in co-channel interference at mobile station 12 on RU1 and RU4. RU2, RU3, and RU5 have no co-channel interference at the mobile station 12 receiving the data.

As set forth in detail below, the embodiments described herein operate to estimate the Signal to Interference and Noise Ratio (SINR) for each resource unit. The SINR of each RU may be different because the CCI may occur in a portion of RUs allocated to the user. Since each RU may have different interference, estimation of interference and noise variance for each resource unit provides improved estimation accuracy. The estimated SINR is then used to modify a log-likelihood ratio (LLR). The SINR may be calculated on the symbol level or bit level. In one embodiment, an iterative modified log likelihood ratio (LLR) algorithm is applied to combine the two methods and further reduce the effect of co-channel interference, thereby improving system performance.

Figure 2:
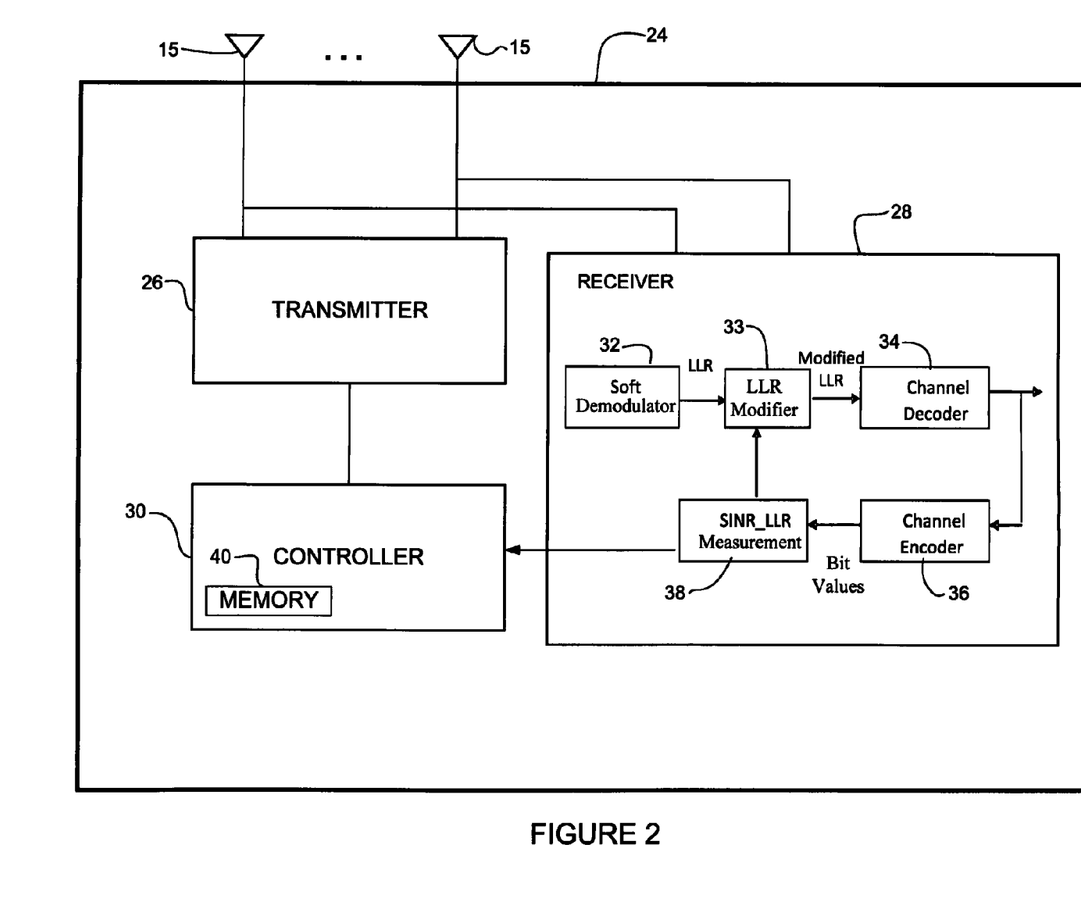
FIG. 2 is a block diagram illustrating an example of a wireless communication device in the system of FIG. 1.

Referring now to FIG. 2, a block diagram of a wireless communication device 24 in accordance with one embodiment is shown. The device may operate as the mobile station 12 or base station 14, 16 of FIG. 1, for example. The wireless communication device 24 includes a transmitter 26, receiver 28, and a controller 30. The controller 30 supplies data to the transmitter 26 to be transmitted and processes signals received by the receiver 28. The transmitter 26 may comprise individual transmitter circuits (not shown) that supply respective upconverted signals to a corresponding antenna 15. The wireless communication device 24 may include one or any number of antennas 15 for transmission.

The receiver 28 comprises a detector (soft demodulator) 32 for demodulating signals received at all of the antennas 15 and generating soft information about the received signal (e.g., LLR data). The LLR data is sent to a channel decoder 34. The receiver 28 also comprises a channel encoder 36 for supplying feedback to an SINR_LLR measurement block 38. The SINR_LLR measurement block 38 provides data to an LLR modifier module 33, which updates the soft value LLR according to the SINR of each RU, as described in detail below. The receiver 28 may also include a plurality of receiver circuits (not shown), each for a corresponding one of the antennas 15.

The controller 30 comprises a memory 40 or other data storage that stores data used for embodiments described herein. Instructions for performing embodiments described herein may be stored in memory 40 for execution by the controller 30. The functions of the controller 30 may be implemented by logic encoded in one or more tangible media (e.g., embedded logic such as an application specific integrated circuit, digital signal processor instructions, software that is executed by a processor, etc.), wherein the memory stores data used for the calculations described herein.

It is to be understood that the wireless device 24 shown in FIG. 2 and described above is only an example and that changes may be made to the wireless device without departing from the scope of the invention. For example, in one embodiment (described below with respect to FIG. 6) noise and interference is calculated at a symbol level and feedback from the channel decoder is not required.

The following describes calculations performed by the wireless device 24 to estimate interference and nose variance.

A received signal $Y_k$ for $k^{th}$ tone in the OFDM signal is represented as follows:

$$Y_k = H_k X_k + I_k + N_k$$

where:
  $H_k$ is the channel coefficient;
  $X_k$ is the transmitted signal;
  $I_k$ is the co-channel interference; and
  $N_k$ is the AWGN.

In the case where there is no CCI (i.e., RU2, RU3, and RU5 at the mobile station 12 of FIG. 1), the co-channel interference $I_k = 0$. From this example, it can be shown that the SINR of RU1 and RU4 is less than that of RU2, RU3, and RU5. The embodiments described herein estimate the noise and interference power for each RU independently since CCI may occur on some RUs but not necessarily all RUs allocated at the user, as shown in the example of FIG. 1.

The following describes two methods for calculating noise and interference power for each RU. The first is noise and interference power estimation on a symbol level basis and the second is noise and interference power estimation on a bit level basis.

Figure 4:
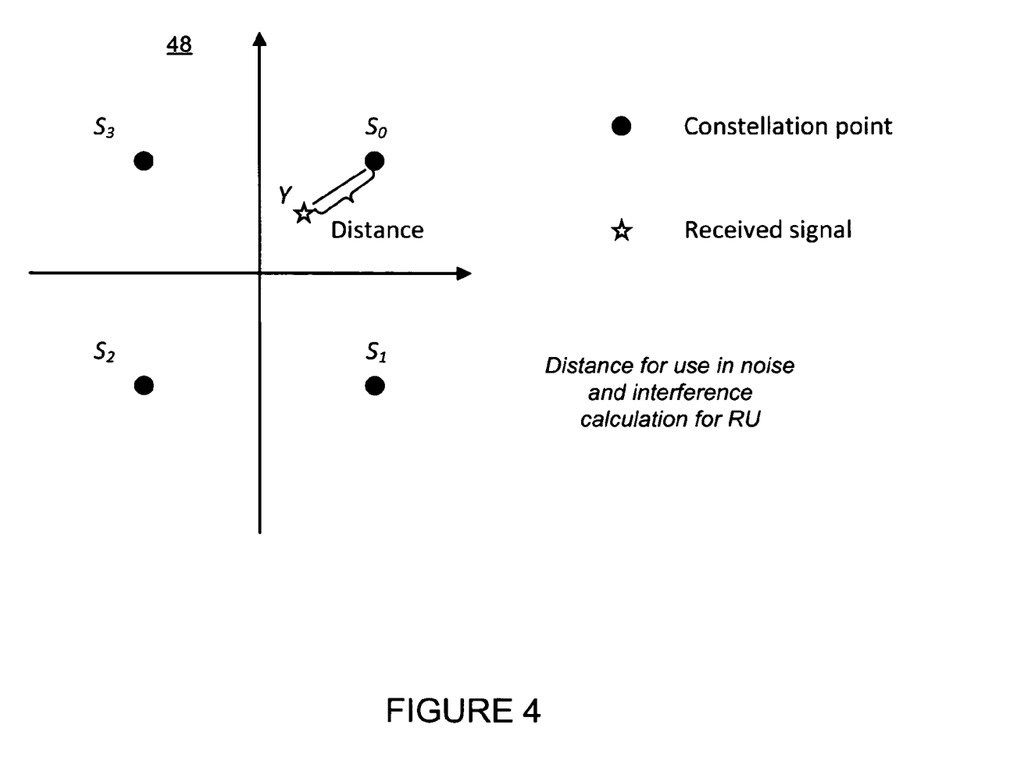
FIG. 4 illustrates a distance between a received signal and symbol in a transmitted constellation for use in noise and interference calculations.

FIG. 4 illustrates noise and interference power estimation with symbol level decision with 4-quadrature amplitude modulation (QAM). In the first method, the distance between the received signal and symbol in the transmitted constellation is used as a noise measurement as shown in the plot 48 of FIG. 4. The distance is defined by:

$$D_k = \min_i(|Y_k - H_k S_i|), i = 0, \ldots, M_c - 1$$

where:
  $Y_k$ is the received signal;
  $H_k$ is the channel coefficient;
  $S_i$ is a point in the transmitted constellation; and
  $M_c$ is the number of points in the constellation.
In the example of FIG. 3, $M_c = 4$, and the points in the transmitted constellation are $S_0, \ldots S_3$.

Estimation noise and interference power ($\sigma^2$) is defined as:

$$\sigma^2 = \text{var}(D_k), \tag{1}$$

where:
  $D_k$ is the distance between the received signal and symbol in the transmitted constellation for the $k^{th}$ tone in the transmitted signal; and
  var( ) is a variance function.

The second method for calculating noise and interference power uses a bit level decision and feedback from the channel decoder as illustrated in FIG. 2. The method includes estimating the SINR according to the LLR data (referred to herein as SINR_LLR) and estimating the noise and interference power from SINR_LNR.

SINR_LLR can be computed as follows:

$$SINR\_LLR = \frac{mean(LLR_n)^2}{std(LLR_n)^2}$$

where mean( ) is the averaging function, std( ) is the standard deviation function, and $LLR_n$ represents a subset of LLR data.

Figure 5:
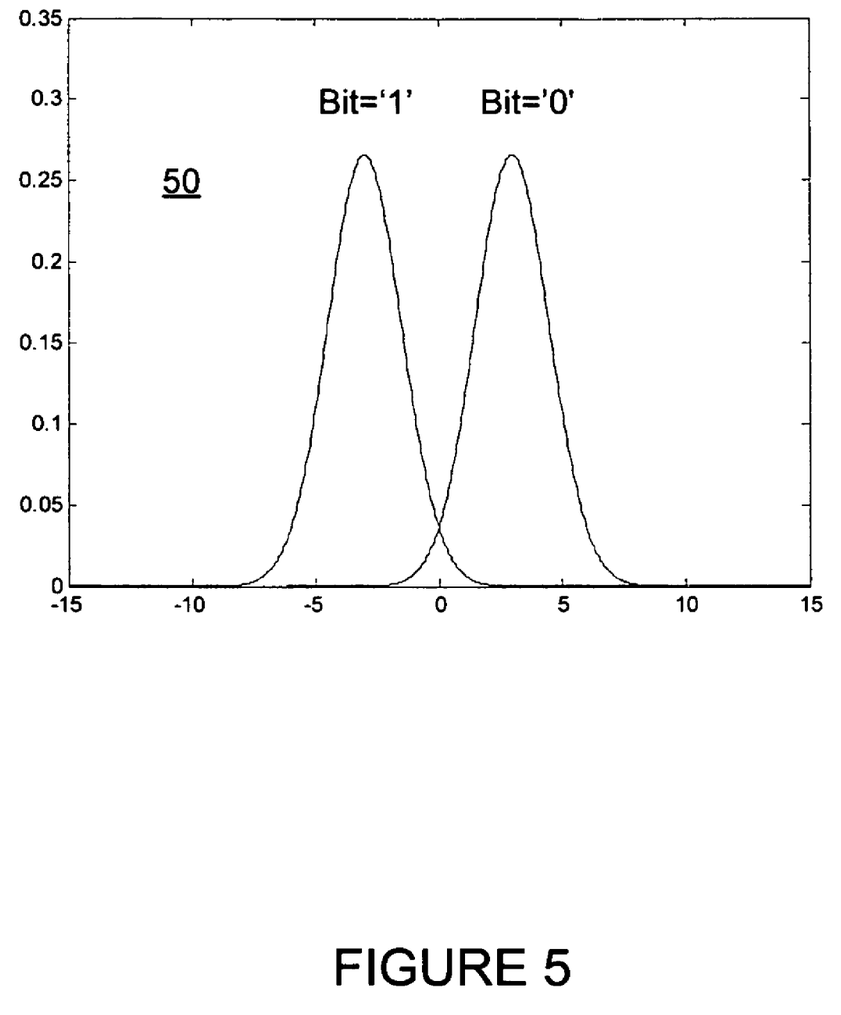
FIG. 5 is a plot showing an example of log-likelihood ratio distributions.

The LLRs may be positive or negative depending on the transmitted binary bit and its reliability. The LLRs can be divided into two groups corresponding to 0 and 1, respectively. Only one group in the LLR distribution is looked at, or the sign of LLR values in one group is flipped and the distribution of all LLRs is used. FIG. 5 illustrates an example of LLR distributions in a plot 50. LLR data forms two Gaussian distributions, one corresponding to transmitted bit 1 another corresponding to transmitted bit 0. Two LLR distributions are depicted for a communication environment. The distributions correspond to transmitted '0' or '1' bits.

In order to know the values of the transmitted bits, a decision-feedback algorithm as shown in the receiver 28 of FIG. 2 is used. The detector 32 generates soft information about the received signal (e.g., LLR data). The LLR is then modified by symbol-level estimated noise and interference. The modified LLR data is sent to the decoder 34. The decoded information is sent as feedback to the LLR based SINR computation 38 via the encoder 36. After the channel decoding, the bit values are known, and these are re-encoded to get the coded bit values. According to these coded bit values, the SINR_LLR measurement is found.

In general, SINR is defined as follows:

$$SINR = \frac{S}{I+N} \approx \frac{S}{\sigma^2}$$

where:
S is the transmitted signal power;
I is the interference; and
N is the AWGN.

The noise and interference power can be estimated from the SINR_LLR measurement. In the embodiments described herein, SINR_LLR is substituted for SINR. In order to simplify the algorithm, SINR_LLR is viewed as a ratio of signal and noise power $\sigma^2$:

$$\sigma^2 \approx \frac{S}{SINR\_LLR} \quad (2)$$

In one embodiment, the interference and noise variance is calculated for each resource unit, in accordance with one of the equations set forth above, and used to modify (weight) the LLR in the channel decoder 34. In another embodiment, an iterative log-likelihood algorithm is used to further improve performance.

Figure 6:
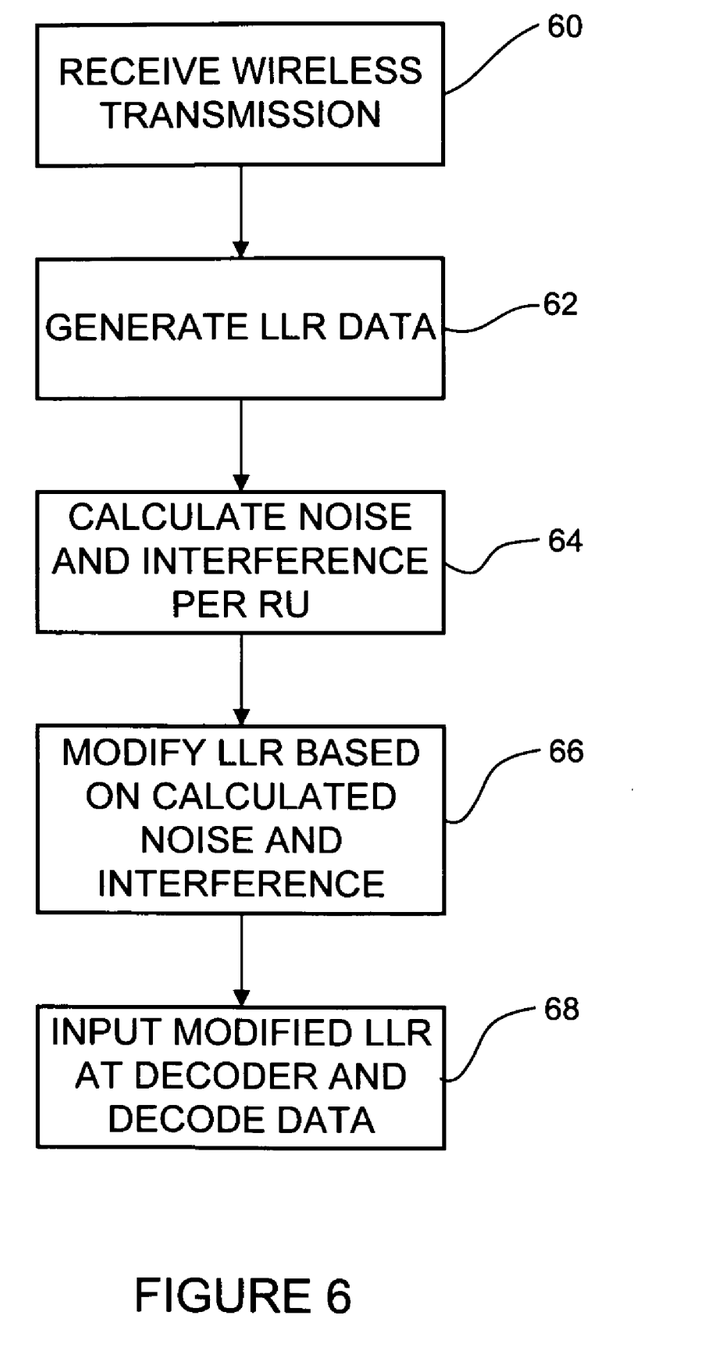
FIG. 6 is a flowchart illustrating a process for calculating weighted log-likelihood ratio per resource unit, in accordance with one embodiment.
Figure 7:
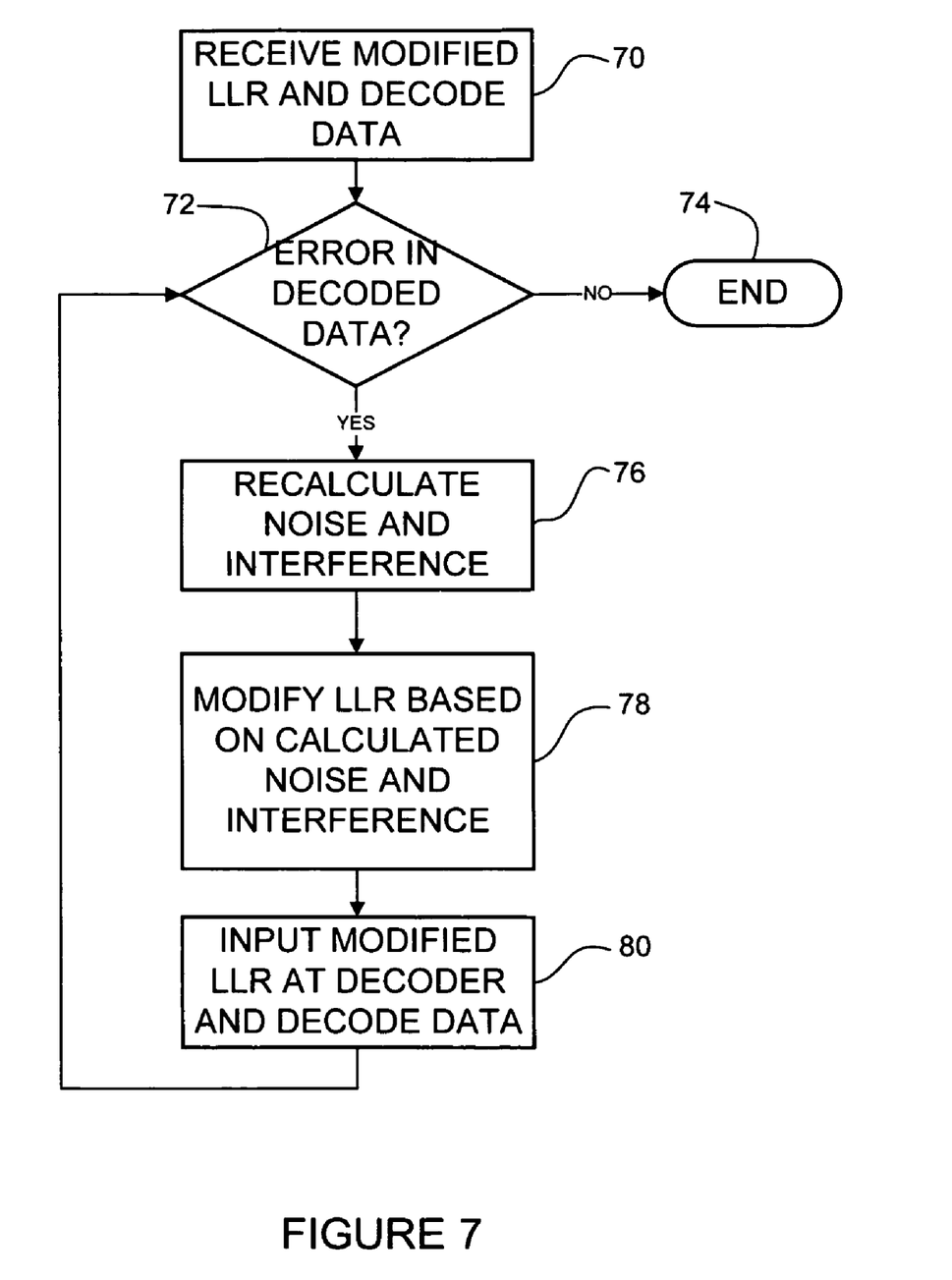
FIG. 7 is a flowchart illustrating an iterative process for calculating weighted log-likelihood ratio, in accordance with one embodiment.

FIGS. 6 and 7 are flowcharts illustrating processes which may use the above equations to calculate noise and interference. The noise and interference is then used to calculate a modified LLR which is used at the decoder. FIG. 6 illustrates a process which calculates interference and noise variance for each RU. FIG. 7 illustrates an iterative modified LLR algorithm.

The process shown in FIG. 6 includes calculating interference and noise variance for each resource unit and using the interference and noise calculation to modify (weight) LLR data. At step 60, a transmission is received at a wireless communication device. The transmission is associated with one or more resource units. The received signals are fed to the detector (soft demodulator) which generates LLR data (step 62). It is to be understood that intermediate processing may occur to produce the received signal, which may be performed by the controller or other processing device. Noise and interference ($\sigma^2$) is calculated for each resource unit (step 64). In one embodiment, $\sigma^2$ is calculated at the symbol level in accordance with equation (1) set forth above. At step 66, the LLR data is modified based on the calculated noise and interference power. The modified LLR (referred to herein as LLR') is calculated as follows:

$$LLR' = LLR/\sigma^2$$

The modified LLR data (LLR') is provided to the channel decoder at step 68. After decoding at step 68, a check may be conducted to determine whether a packet is decoded correctly, and additional processing performed if error is present. These optional steps are shown in FIG. 7 and described below.

FIG. 7 is a flowchart illustrating an iterative method for estimating interference and noise variance and modifying the LLR accordingly. Step 70 refers to decoding performed with modified LLR data, such as described at step 68 of FIG. 6. In one embodiment, the first iteration is based on noise and interference power estimation with symbol level decision (equation (1), steps 64-66 of FIG. 6). The first iteration may or may not be performed on a per resource unit basis.

After decoding, the packet can be checked to determine if the packet is decoded correctly (step 72). An error detection technique, such as Cyclic Redundancy Check (CRC) or any other applicable error detection technique may be used. If no error is found the process ends at step 74. If error is detected, the noise and interference power is recalculated (step 76). In one embodiment, noise and interference power estimation with bit level decision (equation (2)) is used. The noise and interference ($\sigma^2$) may be calculated per RU. The weighted LLR is then calculated at step 78 based on the SINR_LLR calculation at step 76 (LLR'=LLR/$\sigma^2$). The LLR' data is provided to the decoder at step 80. The decoded data may once again be checked for error at step 72, and steps 76-80 repeated if error is found.

It is to be understood that the processes shown in FIGS. 6 and 7 and described above are only examples and that steps may be added or removed, or the order of steps changed, without departing from the scope of the invention.

Although the method and apparatus have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
    receiving a transmission at a wireless communication device, said transmission associated with resource units;
    generating log-likelihood ratio data from the received transmission;
    calculating noise and interference for each of said resource units;
    modifying said generated log-likelihood ratio data based on said calculated noise and interference;
    inputting said modified log-likelihood ratio data to a decoder; and checking an output of the decoder for error and if error is detected recalculating said noise and interference;

wherein said calculating noise and interference is on a symbol level basis and said recalculating noise and interference is on a bit level basis.

2. The method of claim 1 wherein modifying said log-likelihood ratio data comprises dividing said generated log-likelihood ratio data by said calculated noise and interference.

3. The method of claim 1 wherein calculating said noise and interference comprises:

calculating a signal to interference and noise ratio based on said generated log-likelihood ratio data; and calculating said noise and interference based on said signal to interference and noise ratio.

4. An apparatus comprising:

a receiver configured to receive a transmission from a wireless communication device, said transmission associated with resource units;

a detector configured to generate log-likelihood ratio data from the received transmission;

a controller configured to calculate noise and interference for each of said resource units and modify said generated log-likelihood ratio data based on said calculated noise and interference;

a decoder configured to receive said modified log-likelihood ratio data; and an error detector configured to check an output of the decoder for error and if error is detected transmit the output to the controller for recalculation of said noise and interference;

wherein said noise and interference is calculated on a symbol level basis and said noise and interference is recalculated on a bit level basis.

5. The apparatus of claim 4 wherein modifying said log-likelihood ratio data comprises dividing said generated log-likelihood ratio data by said calculated noise and interference.

6. The apparatus of claim 4 wherein calculating said noise and interference comprises calculating a signal to interference and noise ratio based on said generated log-likelihood ratio data, and calculating said noise and interference based on said signal to interference and noise ratio.

7. An apparatus comprising:

a receiver configured to receive transmission from a wireless communication device;

a detector configured to generate log-likelihood ratio data from the received transmission;

a controller configured to calculate noise and interference and modify said generated log-likelihood ratio data based on said calculated noise and interference; and a decoder configured to decode data using said modified log-likelihood ratio data;

wherein the controller is configured to recalculate said noise and interference if error is present in said decoded data, and said noise and interference is calculated on a symbol level basis and said noise and interference is recalculated on a bit level basis.

8. The apparatus of claim 7 wherein calculating said noise and interference comprises:

calculating a signal to interference and noise ratio based on said generated log-likelihood ratio data; and calculating said noise and interference based on said signal to interference and noise ratio.

9. The apparatus of claim 7 wherein modifying said log-likelihood ratio data comprises dividing said generated log-likelihood ratio data by said calculated noise and interference.

10. An apparatus comprising:

a receiver configured to receive transmission from a wireless communication device;

a detector configured to generate log-likelihood ratio data from the received transmission;

a controller configured to calculate noise and interference and modify said generated log-likelihood ratio data based on said calculated noise and interference; and a decoder configured to decode data using said modified log-likelihood ratio data;

wherein the controller is configured to recalculate said noise and interference if error is present in said decoded data, and recalculating said noise and interference comprises calculating a signal to interference and noise ratio based on said generated log-likelihood ratio data, and recalculating said noise and interference based on said signal to interference and noise ratio.

11. The apparatus of claim 10 wherein modifying said log-likelihood ratio data comprises dividing said generated log-likelihood ratio data by said calculated noise and interference.

* * * * *